United States Patent [19]
Conibear

[11] 3,762,094
[45] Oct. 2, 1973

[54] TRIGGER MECHANISM FOR ANIMAL TRAP

[76] Inventor: Frank Conibear, 2170 Evergreen Pl., Victoria, British Columbia, Canada

[22] Filed: Dec. 13, 1971

[21] Appl. No.: 207,423

[52] U.S. Cl. ................................................ 43/92
[51] Int. Cl. ......................................... A01m 23/26
[58] Field of Search ..................... 43/88, 90, 92, 93

[56] References Cited
UNITED STATES PATENTS

| | | | |
|---|---|---|---|
| 2,701,428 | 2/1955 | Mau | 43/90 |
| 2,947,107 | 8/1960 | Lehn | 43/92 |
| 3,010,245 | 11/1961 | Conibear | 43/90 |
| 3,146,545 | 9/1964 | Frost | 43/90 |

Primary Examiner—Warner H. Camp
Attorney—Christopher Robinson et al.

[57] ABSTRACT

An improved trigger mechanism of the foot tread type for rotating frame animal traps, wherein a lever rests in the lower central portion of the trap substantially parallel to the base of the trap with the free end of the lever in frictional engagement with a firing surface which is connected to one frame and substantially perpendicular to the base of the trap. The fulcrum end of the lever is connected to a portion of one of the frames remote from the firing surface and has a detent mechanism associated therewith which releasably engages, when the trap is set, a retaining means associated with a proximate portion of the other frame. An animal, when in a vulnerable position with respect to the jaws of the trap causes the free end of the lever to be dislodged from the firing surface and the simultaneous disengagement of the detent permitting the closing of the jaws of the trap about the animal.

13 Claims, 2 Drawing Figures

PATENTED OCT 2 1973 3,762,094

TRIGGER MECHANISM FOR ANIMAL TRAP

BACKGROUND OF THE INVENTION

This invention relates to an improved trigger mechanism for a rotating frame type of animal trap. More particularly, the present invention relates to an improved foot tread trigger mechanism which may be used on a rotating frame trap. By a rotating frame trip is meant a trap which comprises a pair of similar frames, which may be of a generally square or rectangular shape, pivotally connected at adjacent ends for relative rotation on a common axis so as to form by their sides two pairs of co-acting jaws. At least one actuator, consisting of a coil spring having arms terminating in closed rings slidable along and encircling one set of adjacent ends of the frames, is used to urge the jaws toward and, when the trap is sprung, maintain them in closed position. In my U. S. Pat. No. 3,010,245, dated Nov. 28, 1961, such a rotating frame trap is described in which the ends which co-operate with the rings are shaped so that in the set position of the trap, these ends lie substantially parallel to each other, while the central portions of these ends near the common axis of the frames form a cross with each other within the rings on the arms of the coil spring. A trigger means (for example as described in my above mentioned U. S. Patent or in Lehn U. S. Pat. No. 2,947,107 dated Aug. 2, 1960), maintains the frames in open position when the trap is set, but when the trap is sprung releases the frames so as to permit, as a result of the action of the spring and rings on the ends, rapid rotation of the frames through an angle of about 90°, so that the jaws quickly strike and kill an animal in the trap.

A standard commercial trigger mechanism presently used in association with rotating frame traps is described in Lehn U.S. Pat. No. 2,947,107 issued Aug. 2, 1960. Essentially, Lehn describes a trigger mechanism comprising two prongs adapted to project inwardly towards the center of an open, set trap which prongs are fixedly connected to a first sleeve rotatably connected to one of the sides of one of the frames of the trap. A bar rotatably mounted by a second sleeve on the adjacent side of the other frame opposite this first sleeve, has a notch therein adapted to releasably fit over the first frame through a slot in this first sleeve, the bar thereby releasably holding the trap frames in open set position against the bias of the actuator. When the prongs are moved, for example by an animal passing through the open, set trap, they rotate the first sleeve. The bar is thereby dislodged, permitting the trap to close. Other notches, spaced along the bar, permit the adjusting of the pressure required to release the set trap.

This Lehn two-pronged push or pull type of trigger suffers from the disadvantage that the two prongs projecting into the center of the trap act as a deterrent to animals passing through the trap. Animals dislike pushing or brushing against any such projection for fear of damaging their fur or making a scraping noise which would warn their enemies or prey of their presence. Moreover, the action of this two-pronged trigger is not similar or effective for all animals. For instance, a large animal would push against the prongs and spring the trap before it got very far through the trap opening. A smaller animal would attempt to slide around the ends of the prong and might slip through the trap without setting it off or else would be so far through the trap before setting it off that the animal would be caught across the small of the back. Other disadvantages of this trap trigger mechanism arise from the facts that it is subject to some extent to freezing due, for example, to ice or rust because of the tight fit of the prong and bar sleeves on the respective sides of the trap, making the trap, at times, ineffective, and that the pressure release adjustment of the trap is not very sensitive. Moreover, when a rotating frame trap having large actuator rings (for strong initial starting power of the jaws) is used, the moving parts of the trigger mechanism have a tendency to bite into each other because of the extreme pressures present when the trap is set, thus making it difficult to release the trap. However, prongs of a length too great to be practical would be required to provide the necessary leverage to release the trap and overcome this problem.

Another trigger mechanism for use on rotating frame traps, again of the inwardly directed prong type, is described in my above-mentioned U. S. Pat. No. 3,010,245.

It is an object of the present invention to provide a trigger mechanism for such a rotating frame trap which is more likely to ensure that an animal will be in a vulnerable position with respect to the jaws of the trap when it springs the trap. It is a further object of this invention to provide a trigger mechanism which does not require the use of prongs projecting into the centre of the trap for activation, and which thereby avoids the problems inherent in such a trigger mechansim.

SUMMARY OF THE INVENTION

In the trap trigger mechanism according to the present invention the frames of the trap are adapted to be held in open position by a detent which is adapted to releasably engage a retaining means fixedly associated with one of the frames. This retaining means may be a portion of the frame itself. The detent is fixedly connected to one end of a lever arm, positioned in the central, lower region of the open, set trap. This end of the lever arm is linked to a fulcrum point fixedly associated with a proximate portion, in the set trap, of the other frame, so that the two frames cannot close, under urging from the actuator, while the detent is in engaged position. The other end of the lever arm is adapted to rest, while the trigger mechanism is in set position, in frictional engagement against a firing surface, positioned substantially perpendicularly to the base of the trap and fixedly associated with a corresponding portion of one of the frames remote from the fulcrum and located so that the lever arm does not obstruct the closing of the jaws when the trigger has been released. A plate-like tread, adapted to be positioned within the trap substantially parallel to and spaced from the base of the trap when the trap is set, is fixedly attached to and centered on the lever arm. When the trigger mechanism is set and an animal walks on the tread, the tread and free end of the lever arm are depressed, dislodging the free end of the lever arm from its frictional engagement with the firing surface. The detent consequently becomes disengaged from the retaining means associated with the first frame, thereby freeing the jaws of the trap, due to the actuator bias, to close about the animal. By the use of such a trigger mechanism, located in a central, lower region of the open, set trap, the trap is rarely sprung until an animal is in a vulnerable position, inwardly extending prongs are avoided, and a "clear"

passageway through the open, set trap is provided for the animal. Moreover, the tread plate can be made of sufficient width so that few, if any, animals can pass through the trap without stepping on the tread plate and releasing the trap. In addition, since the trigger mechanism according to the present invention is constructed without any tight-fitting sleeves, close-fitting joints, or the like, it is not as liable to be affected by rust or the like, as were previously known trigger mechanisms for rotating frame traps.

DESCRIPTION OF THE DRAWINGS

These and other advantages and features of the present invention will be subsequently described in association with drawings of a preferred embodiment, in which.

DESCRIPTION OF THE PREFERRED EMBODIMENTS

In the following description of the illustrated embodiment, directional terms such as "vertical," "horizontally," "downward," etc., have been used to facilitate the description, and are not intended to restrict or imply restrictions on the operation of the invention.

Figure 1:
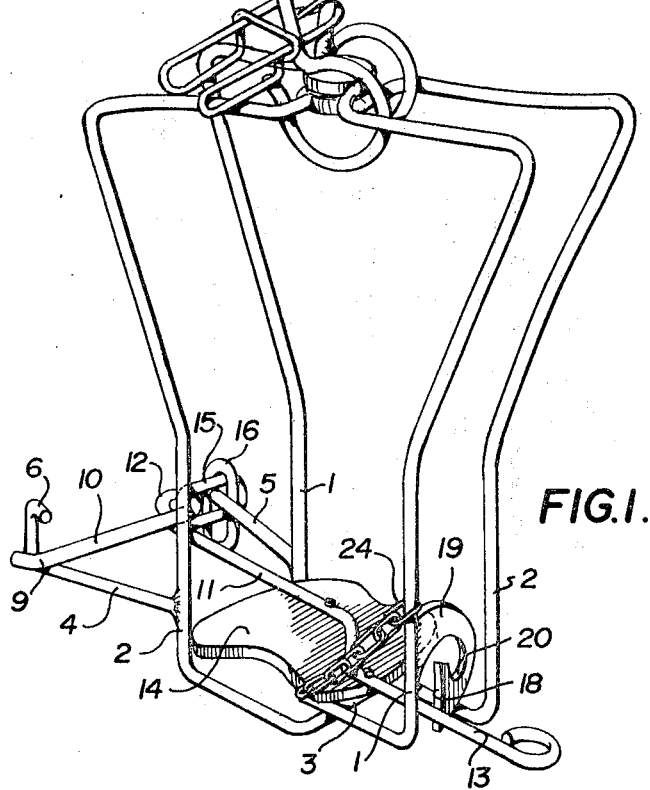
FIG. 1 is a perspective view of an open, set rotating frame trap of the type described in my co-pending application Ser. No. 208,372 having a trigger mechanism according to the present invention.

The trigger mechanism, as illustrated in FIG. 1, is mounted on the sides or jaws of frames 1 and 2. These jaws are rotatable about pivot means 3. Outward extensions 4 and 5, fixedly attached to the lower portions of the jaws of frames 1 and 2 which are proximate when the trap is in open position, extend substantially horizontally and outwardly away from the axis of rotation of the frames. Extension 4 terminates in a retaining means which consists of an upward vertical post 6. Detent 9 slidably and releasably engages post 6 when the trap is set. Detent 9 is fixedly connected by way of detent arm 10 to lever 11 by way of integral loop 12. Lever arm 11 extends through the lower center portion of the frames in open, set position terminating in free end 13. A tread plate 14 is fixedly attached to a central portion of lever arm 11, within frames 1 and 2, so that this tread plate can be positioned substantially parallel to and spaced from the base of the trap when the trap is set.

Loop 12 at the one end of lever 11 is connected by way of link 15 to loop 16 integrally fixed to the end of extension arm 5, which thereby acts as the fulcrum for the lever arm 11. There is sufficient slack in this link connection to permit limited longitudinal movement of lever arm 11.

Figure 2:
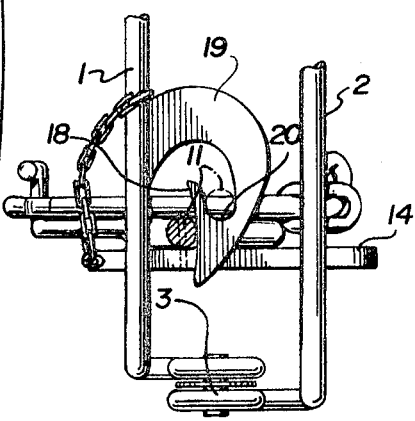
FIG. 2 is a partial side view of the trap and trigger mechanism illustrated in FIG. 1, illustrating the lever arm in set position and in safety position.

When the trap is in open set position, free end 13 of lever arm 11 rests in frictional engagement against a substantially vertical, slightly inwardly curved firing surface 18, as shown in FIGS. 1 and 2. This inward curve permits the lever arm to be cradled therein when in set position, to prevent the lever arm from slipping off the firing face too easily. Firing surface 18 is illustrated as being associated with and facing the lower portions of the jaw of frame 1 on the side of the pivot means 3 opposite from extension arm 5, by way of a fixed, outwardly and downwardly curved arm 19. Both firing surface 18 and arm 19 are located on the inner portion of the jaw, when in open, set position, so that the firing surface engages the lever arm in a position which will not obstruct the closing of the jaws when the trigger mechanism is released. A notch 20, located behind firing surface 18 and downwardly of its uppermost point, it provided as a safety harbour in which the free end 13 of lever arm 11 can rest while the trap is set, so that the trigger cannot be released with the lever arm in this position. The trigger mechanism is designed so that, when the free end 13 of lever arm 11 is resting in notch 20 and detent 9 is in engagement with post 6 so that the trap is in otherwise set position, the detent cannot be released, enabling the trap to close, by downward or horizontal movement of the lever arm 11 or tread plate 14.

Notches may optionally be arranged at different heights on post 6 to receive detent 9 in releasable engagement at different heights, thereby permitting the varying of the pressure required on the tread plate to the release of trigger mechanism. When the detent 9 would be engaged in an upper slot on the post, the set trigger mechanism would require less pressure on the tread plate to dislodge the detent and set off the trap.

It should be noted that the free end 13 of lever arm 11 extends beyond firing surface 18 and beyond the jaws of the trap. This feature permits the trap to be set while one's fingers are outside the effective area of the jaws of the trap. This is a very desirable safety feature of the trigger mechansim according to this invention.

A short chain 24 connects tread plate 14 to one frame of the trap.

When the trap is in open set position, as illustrated in FIGS. 1 or 2, with the lever arm 11 frictionally engaging the vertical firing surface 18, an animal passing through the trap will normally place one or both of its front feet on tread plate 14. This downward pressure will be such that the lever arm 11 will be depressed sufficiently to slip off firing surface 18. This motion of the lever arm will be sufficient to dislodge detent 9 from engagement with post 6, thereby removing all resistance to the actuator bias on frames 1 and 2. The jaws of the trap will thus close about the animal.

It should be noted that there must be sufficient clearance between the bottom of the firing surface 18 and upper portions of the pivot means 3 and portions of frames located below the tread plate and lever arm when the trap is in open, set position, to allow the lever arm 11 to drop freely below the bottom edge of the firing surface when the trigger mechanism is released.

The angle between detent 9 and detent arm 10 depends on the power of the actuator and the relative positioning of lever arm 11, firing surface 18, post 6 and the fulcrum. For any given construction of the trap according to this invention, this angle must be such that the detent engages the post when the trap is set, until and only until the lever arm drops below the bottom edge of the firing surface. When the lever arm drops below the bottom edge of the firing surface, the detent becomes disengaged from the post and the trap jaws close under urging from the actuator. Of course, the angle in question must not be so great that the pressure of the post against the detent, when the trap is set, causes the detent to become disengaged while the lever arm is still resting against the firing surface.

Tread plate 14 is positioned in such a way that any animal passing through the trap will be in its most vulnerable position with respect to the trap jaws at the time the animal releases the trigger and sets off the trap. Usually, the animal's shoulders would be directly over the axis and one set of jaws would close over the heart area.

Chain 24 permits the use of a larger tread plate than otherwise would be possible by ensuring that the tread plate will not move about sufficiently to obstruct the closing action of the jaws of the trap.

It is a feature of this trap that the link engagement of the lever arm 11 to the fulcrum permits limited movement of the lever arm in a generally lengthwise direction. By positioning lever arm 11, when setting the trap in a direction towards the firing surface 18 and away from the fulcrum, the lateral pressure exerted by the end of the lever arm on the firing surface is thereby increased, with the result that there is more friction at this point on the firing surface and more pressure is required on the tread plate to overcome this friction and push the end of the lever off of the firing surface. On the other hand, if the lever arm 11 is positioned towards the fulcrum and away from firing surface 18, less pressure results on the firing surface from the lever arm. There is thus less friction between end of the lever arm and the firing surface, and less pressure is required on the tread to push the end of the lever off the firing surface. With this pressure release adjustment, it is possible to achieve sensitive variations in the pressure required to release the trigger mechanism, over a large range of pressures. Thus, for example, the trap can be set so that it is unlikely to be triggered by small, unwanted animals or small birds.

Of course, because of the absence of tight-fitting sleeves or close-fitting joints, the trap is not as liable to become frozen up with rust, ice, sleet, or the like. If ice freezes to the chain connections or links, it will break away with the slightest pressure, thereby not interfering with the operation of the trap.

While the fulcrum end of the lever arm could be linked directly to one of the jaws of the trap, with detent 9 engaging a corresponding opposed jaw 7 instead of post 6, extension arms 5 and 4 have been used in the illustrated trigger mechanism in order to move the fulcrum farther away from the tread and thus permit greater leverage and give a more even leverage from side to side on the tread.

The wide foot tread used in the present invention is too wide for most of the animals sought to be trapped to step over.

Also, it should be mentioned that the slight movement of the lever arm which is required to release the trigger mechanism which movement for example, might be no more than one-fourth inch, enables the trap to be sprung despite snow, leaves, reeds, etc., which might collect under the lever arm and tread. Generally speaking such obstacles would offer little resistance to such slight movement.

When used in accordance with the trapezium shaped rotating frame trap described in my copending application Ser. No. 208,372 wherein the upper frame ends about which the actuator rings are disposed, are of substantially greater length than the lower frame ends, and wherein each of the jaws comprises a lower portion parallel to the axis of rotation of the trap and an upper flared portion joining the lower portion and the upper frame end and meeting the upper frame end at an acute angle (as illustrated in FIG. 1 herein) the trigger mechanism of this invention is very effective. When used on such a trap, this trigger mechanism helps to ensure that most long-necked animals in the trap would be caught by one set of jaws closing on the neck from both sides, and the other set of jaws closing from both sides directly behind the shoulders. However, it is possible for some animals, such as a muskrat, whose neck is so short that its feet are just under its chin, to be caught across the neck or shoulders by one set of jaws only. In cases like this, the striking and squeezing power of the jaws is sufficient to quickly kill the animal. Because of the increasing width between the jaws, when the trap is set, towards the top of such a trap, the jaws will close in the same relative positions on the larger animal as they would on a smaller one.

What I claim as my invention is:

1. In an animal trap of the type having similar first and second frames, each having sides serving as jaws and ends extending therebetween, and which are pivotally connected through adjacent ends for relative rotation between set and closed positions about a common axis, and an actuator capable of rapidly and forcefully effecting such rotation, an improved trigger means for releasably maintaining the trap in set position which comprises, when the trap is in the set position:
   i. a firing surface fixed to a lower portion of one of the frames on the side thereof opposite to the direction of rotation when closing of that portion of the frame, and disposed substantially perpendicularly to the base of the trap; and facing the proximate portion of the frame
   ii. a tread plate positioned substantially parallel to and spaced from the base of the trap;
   iii. a lever arm fixed to said tread plate, one end of which lever arm is linked to a fulcrum point associated with a lower portion of the first frame remote from said firing surface of the trap when set, the opposite, free end of which lever arm frictionally engages said firing surface so that the lever arm and tread plate are positioned in the central, lower region of the open, set trap;
   iv. a retaining means associated with the second frame at a portion of said frame remote from said firing surface and proximate to said fulcrum point of said first frame; and
   v. a detent which is fixed to the fulcrum end of the lever arm and releasably engages said retaining means; whereby the first and second frames are releasably held in open position against the bias of the actuator until the tread plate is depressed, causing the free end of the lever arm to pass downward and out of engagement with said firing surface, so that the detent becomes disengaged from said retaining means, freeing the jaws of the trap to close.

2. An animal trap according to claim 1 wherein said fulcrum point to which the lever is linked is provided by an arm fixed to and outwardly extending from the side of the first frame, remote from the firing surface in a direction away from the firing surface.

3. An animal trap according to claim 2, wherein said retaining means comprises a post positioned substantially perpendicularly to the base of the trap and fixed to the side of said second frame which is proximate to the fulcrum end of the lever by an arm fixed to and outwardly extending from said side of the second frame in a direction away from the firing surface, whereby said detent releasably engages said post.

4. An animal trap according to claim 3, wherein an arm connects the firing surface to the frame.

5. An animal trap according to claim 4 wherein said firing surface arm and said outwardly extending arms are fixed to lower portions of said sides of the respective frames.

6. An animal trap according to claim 5 wherein the upper adjacent frame ends are of substantially greater length than the lower frame ends, the actuator being adapted to act upon said upper adjacent frame ends to effect rotation of the frame and wherein each of the jaws comprises a lower portion parallel to the axis of rotation of the trap and an upper flared, portion joining the lower portion and the upper frame end and meeting the upper frame end at an acute angle.

7. An animal trap according to claim 5 wherein the link connection of the fulcrum end of the lever arm allows limited longitudinal movement of the lever arm, whereby the longitudinal positioning of the lever arm engagement with the firing surface can be altered to adjust the pressure required on the tread plate to release the trigger means.

8. An animal trap according to claim 5 wherein said post has a plurality of notches therein, located at different heights, each notch adapted to receive said detent in releasable engagement whereby the release pressure required on the tread plate to release the trigger means may be adjusted.

9. An animal trap according to claim 5 wherein a short chain connects said tread plate to one of said frames so that said tread plate does not obstruct the closing of the jaws upon the firing of the trap.

10. An animal trap according to claim 9 wherein said tread plate is as large as possible without obstructing the closing of the jaws upon the firing of the trap.

11. An animal trap according to claim 5 wherein said lever arm extends beyond the firing surface and beyond the jaws of the trap to provide a portion of the lever arm which may be used to set the trap outside of the effective area of the jaws of the trap.

12. An animal trap according to claim 5 wherein said firing surface has a slight inward curve such that the lever arm may be cradled therein to prevent unpurposeful movement of the lever arm from the firing face.

13. An animal trap according to claim 11 wherein a notch is provided in the firing surface arm behind said firing surface and downwardly of its uppermost point for receiving the free end of the lever arm whereby the detent cannot be released from engagement with the post when the trap is set and the lever arm rests in said notch.

* * * * *

UNITED STATES PATENT OFFICE
CERTIFICATE OF CORRECTION

Patent No. 3,762,094          Dated October 2, 1973

Inventor(s) Frank Conibear

It is certified that error appears in the above-identified patent and that said Letters Patent are hereby corrected as shown below:

Column 6, line 31, "frame" should read -- first frame; --

Signed and sealed this 18th day of June 1974.

(SEAL)
Attest:

EDWARD M. FLETCHER, JR.
Attesting Officer

C. MARSHALL DANN
Commissioner of Patents